United States Patent [19]

Assink et al.

[11] Patent Number: 5,580,413
[45] Date of Patent: Dec. 3, 1996

[54] TAPING APPARATUS AND METHOD AND ARTICLE MANUFACTURING THEREWITH

[75] Inventors: Kenneth Assink, Holland; Mark J. Feenstra, Zeeland, both of Mich.

[73] Assignee: J. R. Automation Technologies, Inc., Holland, Mich.

[21] Appl. No.: 514,362

[22] Filed: Aug. 11, 1995

Related U.S. Application Data

[63] Continuation of Ser. No. 131,097, Oct. 1, 1993, abandoned.

[51] Int. Cl.$^6$ .......................... B32B 31/00; B65H 26/00
[52] U.S. Cl. .......................... 156/361; 156/363; 156/517; 156/519; 156/543
[58] Field of Search .................................. 156/350, 353, 156/354, 355, 361, 362, 363, 364, 511, 517, 519, 520, 521, 543

[56] References Cited

U.S. PATENT DOCUMENTS

| | | | |
|---|---|---|---|
| 3,711,354 | 1/1973 | Burger | 156/362 X |
| 3,810,805 | 5/1974 | Goldsworthy et al. | 156/361 |
| 3,832,262 | 8/1974 | Rubaud | 156/468 |
| 4,557,783 | 12/1985 | Grone et al. | 156/361 X |
| 4,591,402 | 5/1986 | Evans et al. | 156/350 |
| 4,601,771 | 7/1986 | Wesley | 156/361 X |
| 4,696,707 | 9/1987 | Lewis et al. | 156/64 |
| 4,750,965 | 6/1988 | Pippel et al. | 156/361 |
| 4,781,782 | 11/1988 | Luhman et al. | 156/361 |
| 4,978,417 | 12/1990 | Grimshaw et al. | 156/361 X |
| 5,117,348 | 5/1992 | Romero et al. | 156/350 X |
| 5,235,515 | 8/1993 | Ungpiyakul et al. | 156/521 X |

Primary Examiner—David A. Simmons
Assistant Examiner—Paul M. Rivard
Attorney, Agent, or Firm—Price, Heneveld, Cooper, DeWitt & Litton

[57] ABSTRACT

An apparatus and method for laying a composite tape on an elongated molding is provided. The apparatus includes a reciprocatable carrier for carrying the molding, a composite tape applicator adapted to apply a pair of parallel strips of composite tape to the back of the molding, and a release-paper-adhering tape applicator adapted to apply release-paper-adhering tape to the release paper on the composite tape. The composite tape applicator includes a composite tape advancing mechanism, a cutter for cutting an expended strip of composite tape from a supply of the composite tape, and a pressing roller for pressing the composite tape securely onto the molding. The release-paper-adhering tape applicator includes a second tape advancing mechanism, a cutter for cutting a section of the release-paper-adhering tape from a supply of the release-paper-adhering tape, and a pressing member and a heater for securely bonding the section of release-paper-adhering tape to the release paper of the composite tape. The apparatus further includes a controller operably connected to the carrier, the composite tape applicator and the release-paper-adhering tape applicator for automatic operation, the controller including the capability of automatically applying release-paper-adhering tape to the end of composite tape strips and also to spliced locations on the composite tape strips so that the release paper can be later removed easily with a single pull when the molding is to be assembled to a vehicle. An article manufactured in accordance with the above is also provided.

37 Claims, 6 Drawing Sheets

TAPING APPARATUS AND METHOD AND ARTICLE MANUFACTURING THEREWITH

This is a continuation of application Ser. No. 08/131,097, filed Oct. 1, 1993, now abandoned.

BACKGROUND OF THE INVENTION

This invention relates to tape laying machines and methods of applying tape, and in particular to an apparatus and method for applying composite tape and. release-paper-adhering tape to the back side of a trim molding to be later installed on a vehicle. Also, the invention relates to an article including the molding and tapes as applied.

In the assembly of automobiles, it is common place to employ double sticky-sided composite tape along with plastic clips to attach body side trim moldings to the side of an automobile. The laying of the composite tape onto the trim molding has historically been done manually. However, the manual operation is time consuming and tedious, thus leading to high scrap rates and poor quality, particularly if the person laying the composite tape is not careful to lay down a straight line. Further, the composite tape includes a release paper on one side to protect the adhesive until application of the molding to the vehicle. However, the release paper can be relatively difficult to pick loose, and thus further waste assembly time.

Thus, an apparatus and method solving the aforementioned problems is desired.

SUMMARY OF THE INVENTION

The present invention includes an apparatus for laying a composite tape onto an elongated molding for a vehicle, the composite tape including a flexible substrate having opposing sides, adhesive covering the sides, and a release paper covering the adhesive on one side. The apparatus includes a carrier configured to support the elongated molding with at least a part of the molding back side exposed and further includes a composite tape applicator for applying composite tape to the molding, the carrier being movable relative to the composite tape applicator. A tape pressing member is positionable proximate the carrier for pressing the expended strip of composite tape onto the back side of the elongated molding. In one aspect of the invention, the apparatus includes a second tape applicator for applying a section of release-paper-adhering tape to the release paper so that the section of release-paper-adhering tape becomes a part of an assembly including the molding and the expended strip of composite tape, whereafter the section of release-paper-adhering tape can later be easily grasped and pulled to remove the release paper from the composite tape, thus exposing the previously covered adhesive on the strip of composite tape to facilitate assembly of the molding to a vehicle.

The present invention also includes a molding assembly including an elongated molding, and a strip of composite tape including a substrate covered on opposing sides by adhesive, the adhesive on one of the sides adheringly securing the strip of composite tape to the molding. A strip of release paper is adhered to the adhesive on the other side of the composite tape to protect the adhesive until use. A section of release paper adhering tape is adhered to the strip of release paper with a portion of the section extending from the strip of release paper to thus define a pull tab so that the pull tab can be grasped to easily remove the strip of release paper from the strip of composite tape.

These and other aspects, features, advantages and objects of the present invention will be further understood and appreciated by those skilled in the art by reference to the following specification, claims and appended drawings.

DETAILED DESCRIPTION OF THE PREFERRED EMBODIMENT

Figure 3:
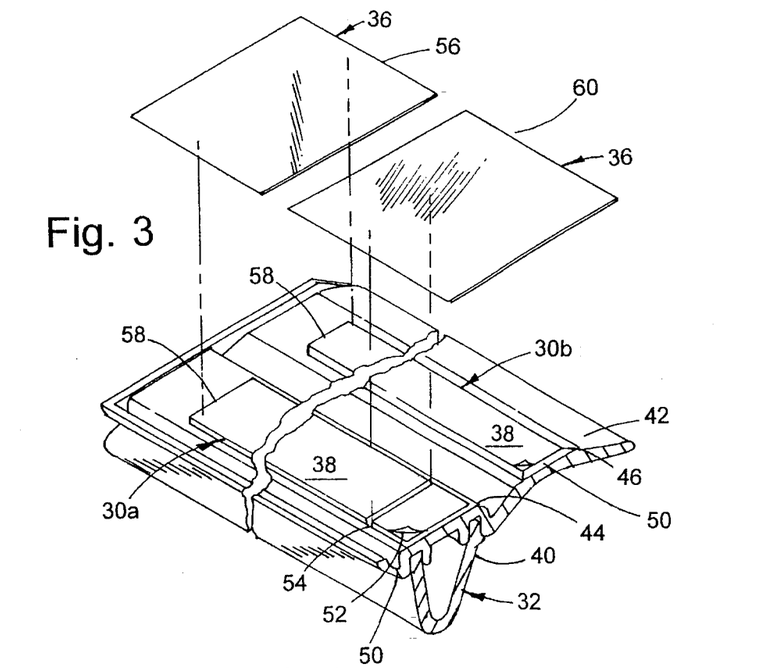
FIG. 3 is a perspective view of a body side molding including a pair of adjacent composite tape strips attached thereto, one of the strips including a spliced location, and including a pair of release-paper-adhering tape sections adhered to the two release papers on the composite tapes, one of the release-paper-adhering tape sections being adhered at an end of the composite tape and the other including a portion straddling the spliced location.

An apparatus 20 (FIG. 1) embodying the present invention includes a reciprocatable carrier 22 for securely carrying a molding 32, a composite tape applicator 24 for applying composite tape to the molding 32, and a release-paper-adhering tape applicator 26 for applying release-paper-adhering tape 36 onto the composite tape, carrier 22 and applicators 24 and 26 each being securely mounted on a frame 28. Apparatus 20 is constructed to lay adjacent strips of composite tape 30a and 30b on the back side of molding 32 (FIG. 3), so that the molding is ready for later installation on a vehicle. Apparatus 20 is further constructed to place sections of a release-paper-adhering tape 36 on release paper 38 of the composite tape 30a and 30b so that the release paper can be removed quickly and easily, thus facilitating efficient installation of the molding 32 onto the vehicle.

Molding 32 (FIG. 3) is an elongated part having a decorative side 40 and a back side 42. Back side 42 includes substantially flat surfaces 44 and 46 for receiving composite tapes 30a and 30b, respectively. Molding 32 is shaped to matably conform to the side of a vehicle, and is adapted to be secured thereto by composite tapes 30a and 30b. Molding 32 may potentially also be secured to the vehicle by plastic clips, fasteners, and the like (not shown). However, these clips, fasteners, and the like are known in the art and need not be described in detail for an understanding of the present invention.

Both of composite tapes 30a and 30b are identical, except that composite tape 30a is slightly wider. Further, the application of composite tapes 30a and 30b to molding 32 are also identical. Thus, only composite tape 30a is described hereinafter, with the discussion also applying to composite tape 30b. Composite tape 30a (FIG. 3) includes a flexible foam substrate 50 coated with adhesive 52 on both sides such that composite tape 30a is a double sticky-sided tape. In the preassembled molding (i.e., before assembly onto a vehicle), composite tape 30a is adhered to molding back side 32 on back surface 44. The adhesive on the "exposed" side of composite tape 30a is covered by release paper 38 to prevent composite tape 30a from accidentally adhering to an undesirable substrate and to further prevent dust and debris from collecting on the adhesive side and thus reducing the adhering quality of composite tape 30a. It is not uncommon to splice composite tape 30a (or 30b) such as is illustrated by splice location 54. For example, this is usually done when one roll of composite tape 30a is used up and a new roll is being started.

When the molding 32 is ultimately ready to be installed on a vehicle, the release paper 30a is pulled off and discarded, thus exposing the adhesive under the release paper. Notably, it is difficult for an operator to manually lay composite tape 30a (or 30b) without wandering sideways off of molding flat surfaces 44 (and 46). Also, it is difficult for an operator to initially pull a corner of release paper 38 free from composite tape 30a (or 30b) such that assembly time is wasted. The present invention greatly aids in solving these problems by quickly, automatically, and efficiently laying a straight line of composite tape, and also by applying release-paper-adhering tape to the release paper both at the ends and also at any splice locations so that the release paper 38 can be quickly and efficiently removed, as discussed below.

Apparatus 20 is adapted to adhere a section 56 (FIG. 3) of release-paper-adhering tape 36 onto the ends 58 of release paper 38 of composite tapes 30a and 30b with a portion of section 56 extending beyond the ends 58. Section 56 is adhered to both of release papers 38 so that, with a single motion, an assembly line worker can grasp and pull section 56, thus pulling release paper ends 58 free from composite tapes 30a and 30b. Release paper 38 can then be pulled completely free of composite tapes 30a and 30b, leaving adhesive 52 exposed for assembly of molding 32 to the vehicle. Another section 60 of release-paper-adhering tape 36 is attached at splice locations 54 so that all of release paper 38 is removable with a single motion even if splices are present. It is contemplated that release-paper-adhering tape 36 can be a Mylar™ tape, although various tapes could be used.

Apparatus frame 28 (FIG. 1) includes a bed 64 with rails 66 thereon for guiding the movement of carrier 22. One or more vertical posts 68 extend upwardly from bed 64. An overhead subframe 70 is mounted to vertical posts 68 generally over bed 64, subframe 70 including horizontal beams 72 with mounting plates 74 and 76 attached thereto.

Figures 1, 2:
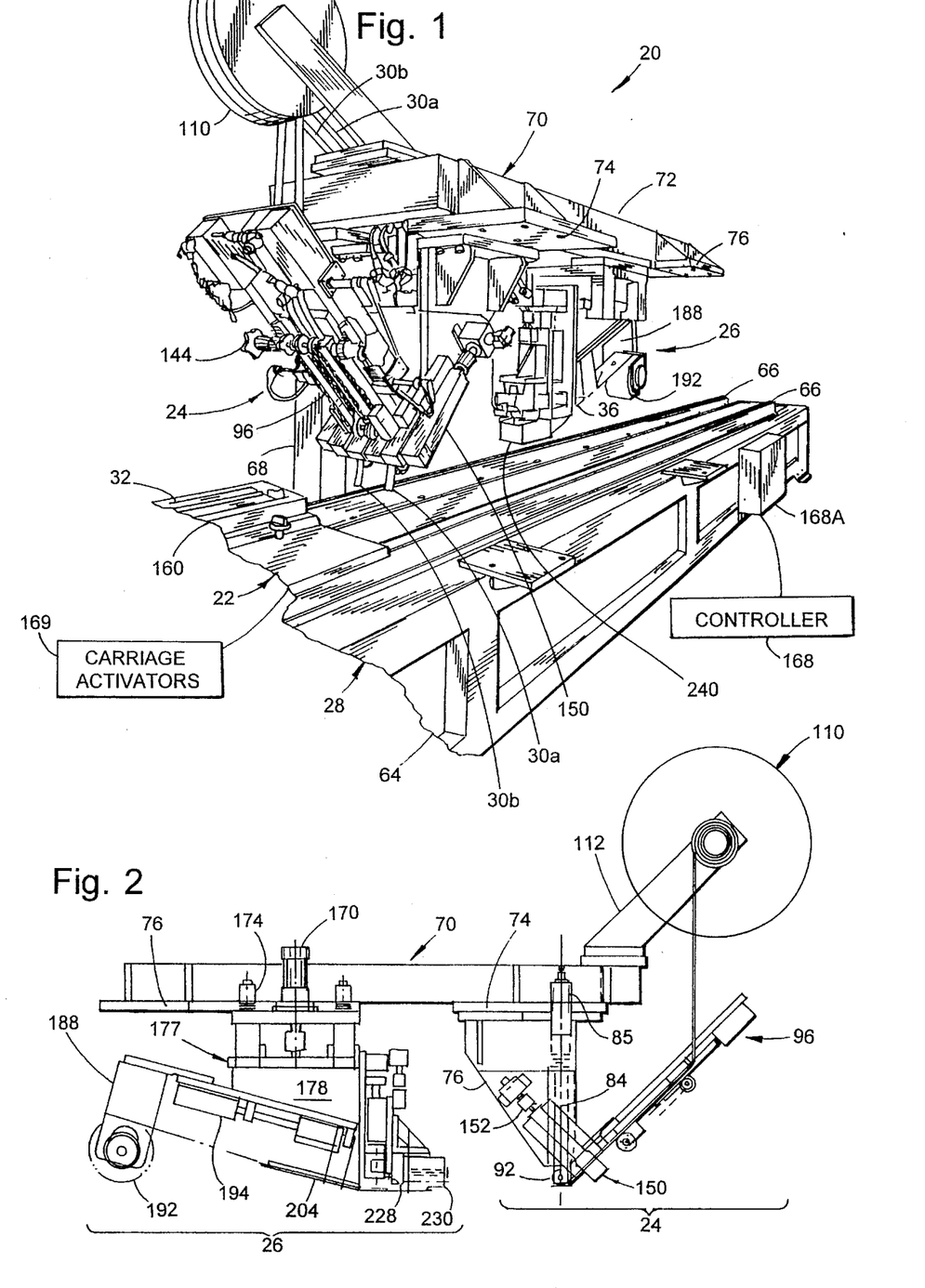
FIG. 1 is a perspective view of an apparatus embodying the present invention, the apparatus including a composite tape applicator and a release-paper-adhering tape applicator.
FIG. 2 is a side view of the apparatus disclosed in FIG. 1.

As best seen in FIG. 2, composite tape applicator 24 and release-paper-adhering tape applicator 26 are mounted to mounting plates 74 and 76, respectively, under subframe 70.

Figure 6:
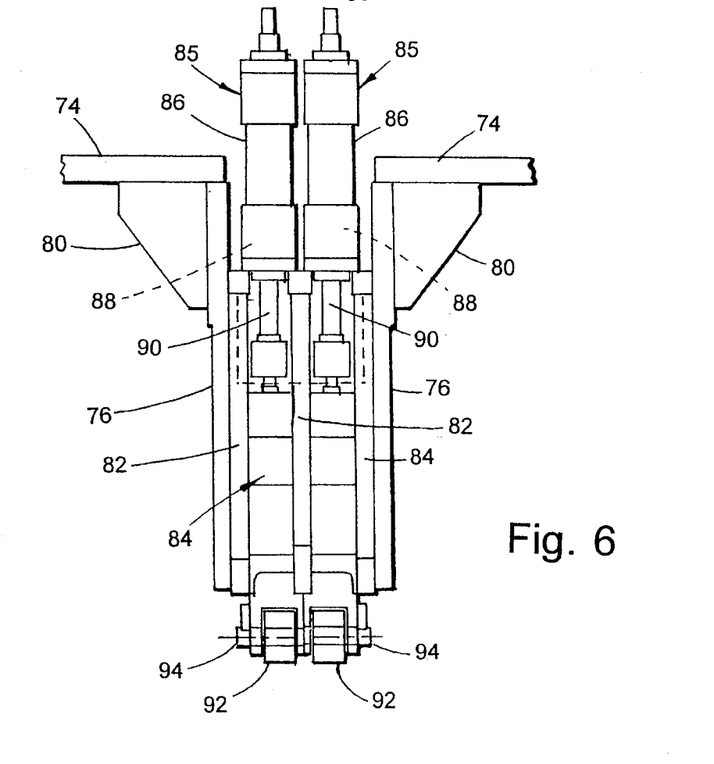
FIG. 6 is an end view of the composite tape applicator taken in the direction of arrow VI in FIG. 4, the composite tape advancing mechanism and the cutter being removed for clarity.
Figure 7:
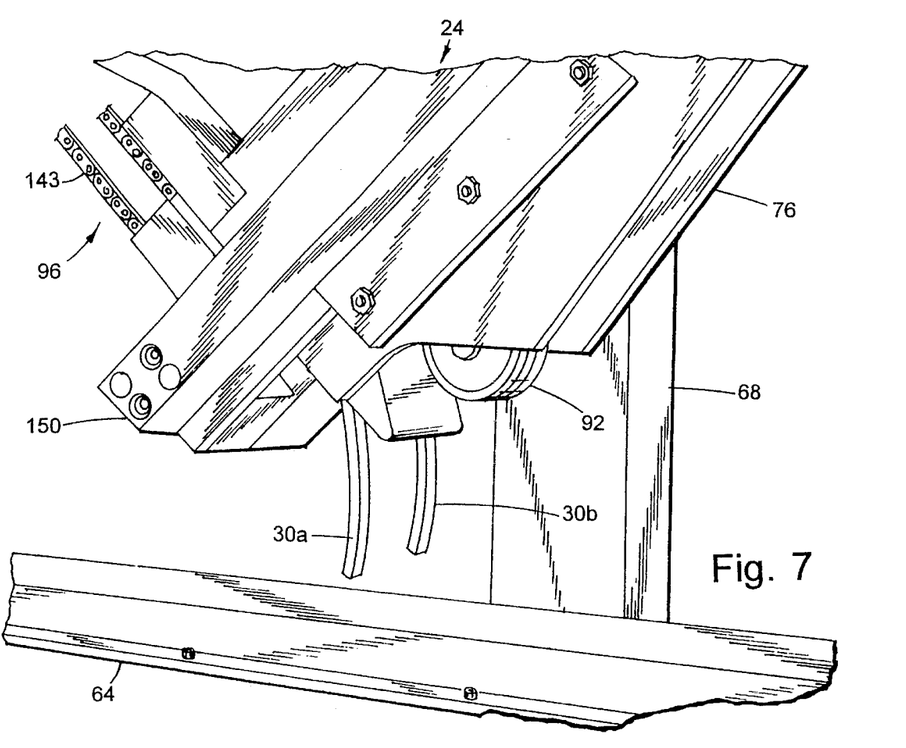
FIGS. 7–8 are perspective views of the composite tape advancing mechanism in the raised and lowered positions, respectively.
Figure 8:
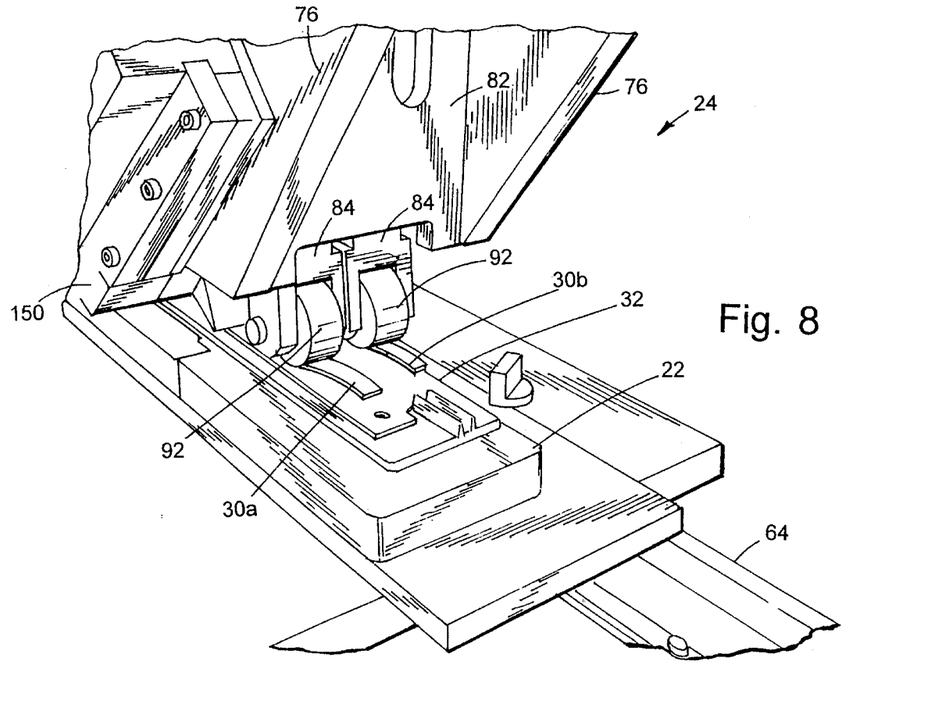

Composite tape applicator 24 (FIG. 4 and 6) includes a pair of side plates 76 mounted to mounting plate 74. Webs 80 are secured to side plates 76 to stabilize side plates 76. Three guide plates 82 (FIG. 6) are secured between side plates 76 to the inside surfaces of side plates 76. A pair of pressing members 84 are slidably secured between and to guide plates 82. A pair of actuators 85 each include a cylinder 86 secured to the top of guide plates 82, and a piston 88 operably mounted in cylinder 86. A piston rod 90 extends from each piston 88 and is secured to pressing member 84. Pressing members 84 each include a roller 92 rotatably mounted to the lower end of pressing member 84 on an axle 94. By actuating a selected cylinder 86, the respective piston 88 can manipulate a selected roller 92/pressing member 84 between a lowered position whereat the roller 92 engages and presses composite tapes 30a (and 30b) onto molding 32 (FIG. 8), and a raised position whereat clearance is provided under the roller 92 (FIG. 7).

A tape advancing mechanism 96 (FIGS. 4 and 5) includes a mounting plate 98 secured to the lower end of side plate 76 in an angled position by brackets 100. A composite tape guide plate 102 is secured to mounting plate 98. Guide plate 102 includes a pair of guide slots or tracks 104 and 106 (FIG. 5) having a width sufficient to receive composite tapes 30a and 30b, respectively. Guide slots 104 and 106 align with rollers 92. Mounting plate 98 defines an enlarged aperture 108 at the end of guide plate 102 opposite rollers 92.

A composite tape holder 110 (FIG. 4) is secured to the top of overhead subframe 70 for each tape 30a and 30b. Specifically, a pair of elongated braces 112 are bolted to overhead subframe 70. A supply 114 of composite tape 30a (and 30b) is rotatably held on the free end of braces 112 by an axle 116. Supply 114 includes a pair of discs 115 with a roll of the appropriately sized composite tape 30a (or 30b) located therein. The arrangement is configured so that composite tape 30a (and 30b) can be expended from supply 114 through enlarged aperture 108 on mounting plate 98 into guide slots 104 (and 106). A tape sensor 115 on mounting plate 98 senses when composite tape holder 110 has run out of composite tape 30a (or 30b). Notably, it is contemplated that tape sensor 115 could be located in different positions, such as on holder braces 112 of tape holder 110. Tape sensor 115 preferably includes a non-contact sensor such as a photocell, however contact-type sensors can also be successfully used. The composite tape 30a (and 30b) is further extended along guide slots 104 (and 106) under roller 92. Notably, as composite tape 30a is expended from supply 114, release paper 38 sticks to the upper side of composite tape 30a (FIG. 4), but the other sticky side of composite tape 30a is uncovered and exposed. It is the release paper side of the composite tape 30a that slidably engages the surface in the depth of guide slot 104 (and 106).

Tape advancing mechanism 96 (FIGS. 4 and 5) is symmetrical and thus only one half is described hereinafter. However, the description applies to both sides. Tape advancing mechanism 96 includes a pair of tape driving wheels 118 and 120 for tape 30a (and for 30b). Driving wheel 118 is rotatably mounted on an axle 122. Axle 122 rides in a bearing 124 mounted on guide plate 102 near the leading end of guide slot 104 (and 106). Driving wheel 120 is rotatably mounted on an axle 126. Axle 126 rides in a bearing 128 mounted on guide plate 102 near the trailing end of guide slot 104 (and 106). Driving wheels 118 and 120 are positioned over guide slot 104 (and 106) at a height such that the outer surface of driving wheels 118 and 120 contact the exposed adhesive side of composite tape 30a (and 30b) as the tape is moved under wheels 118 and 120. However, driving wheels 118 and 120 are made of a material that does not tend to adhere to composite tape 30a (or 30b).

Figure 4:
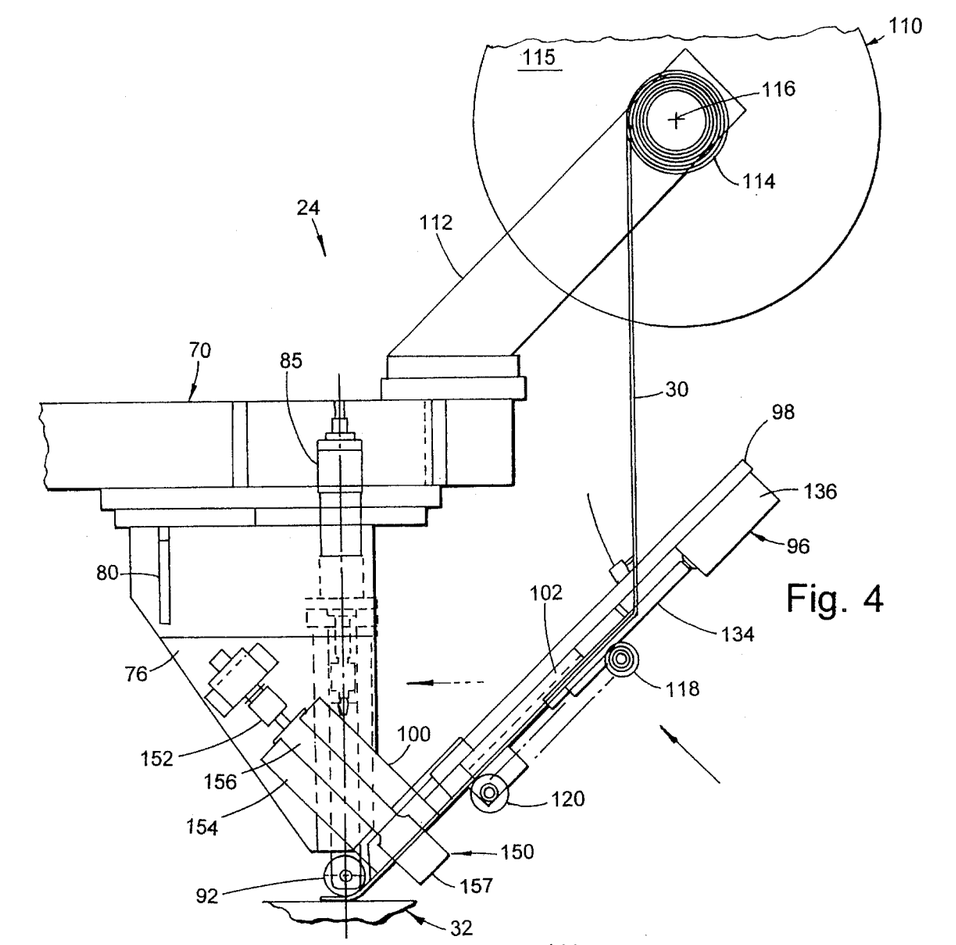
FIG. 4 is an enlarged side view of the composite tape applicator shown in FIG. 2.
Figure 5:
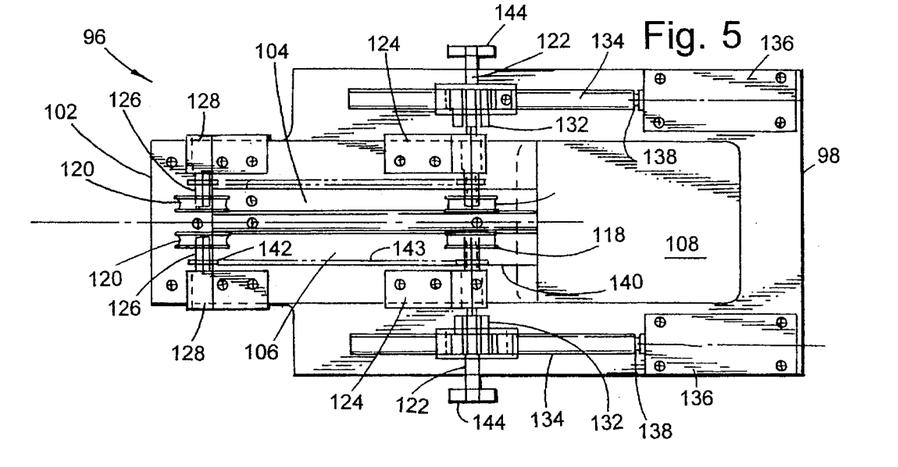
FIG. 5 is a view perpendicular to the bottom of the composite tape advancing mechanism, taken in the direction of arrow V in FIG. 4.

Driving wheels 118 and 120 are driven as follows. A pinion gear 132 is mounted on axle 122 of each leading driving wheel 118. A rack gear 134 is slidably mounted on mounting plate 98 under and operably adjacent pinion gear 132. An actuator 136 is mounted on mount plate 98, actuator 136 including an extendable piston rod 138 connected to rack gear 134. As actuator 136 extends piston rod 138, rack gear 134 moves linearly causing pinion gear 132 to rotate axle 122 and thus rotate driving wheel 118. Driving wheels 118 and 120 are operably interconnected for simultaneous movement by sprockets 140 and 142 located on each of axles 118 and 120, respectively, and by a "bicycle chain" type belt 143 extending around sprockets 140 and 142. A handle or knob 144 is further secured to the outer end of axle 118 so that axle 118 can be manually rotated to expend composite tape 30a (or 30b). Notably, driving wheels 118 and 120 and sprockets 140 and 142 are operably mounted on axles 122 and 126 so that axles 122 and 126 engage and are driven in a first direction for advancing the composite tape 30a (and 30b) but so that they rotatingly slip in a second direction as piston rod 138 (and rack gear 134) is retracted.

A cutter 150 (FIG. 4) is also attached to the side of each side plate 76 for cutting each composite tape 30a and 30b. Cutter 150 includes an actuator 152, and a slide 156, slide 156 being operably mounted to side plates 76 by bearing 154 and movable by actuator 152. Slide 156 includes a cutting head 157. Composite tapes 30a and 30b are routed through cutting head 157 as the tape is expended frown slots 104 and 106 under rollers 92.

Figure 9:
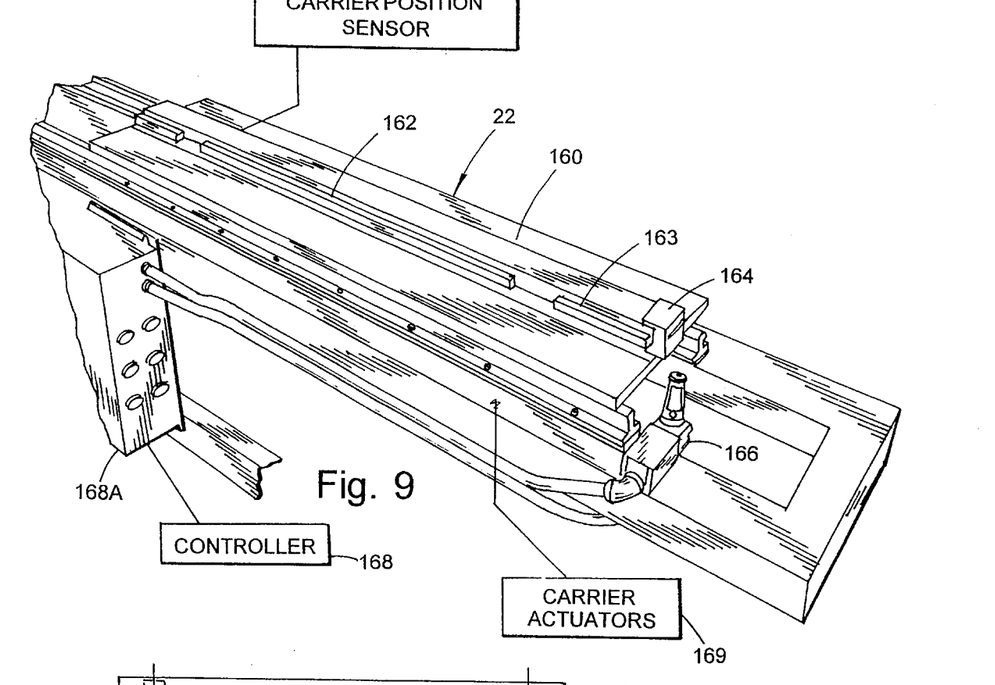
FIG. 9 is a perspective view of the molding carrier shown in FIG. 1.

Carrier 22 (FIG. 9) is slidably mounted on rails 66 of bed 64 for reciprocating movement under composite tape applicator 24 (FIG. 1). The upper surface 160 of carrier 22 (FIG. 9) is configured to securely hold molding 32, such as by use of fixturing blocks 162, 163, and 164. Safety switches 166 are attached to the ends of beds 64 to limit the maximum travel of carrier 22, and a position sensor 167 is used to sense the position of carrier 22 relative to applicators 24 and 26. A control box 168A and controller 168 is operably attached to limit switches 166, position sensing switch 167, actuators 169 for carrier 22, composite tape advance mechanism actuators 136 (FIG. 4), cutter actuators 152, and pressing member roller lift actuators 85, as discussed below. It is contemplated that controller 168 could also be replaced with a programmable microprocessor or similar equipment.

Release-paper-adhering tape applicator 26 (FIGS. 10 and 11) includes a secondary mounting plate 172 attached to mounting plate 76. Secondary mounting plate 172 includes two pair of linear bushings 174, and a pair of actuators 170 having cylinders 176 mounted on mounting plate 172. A lower subassembly 177 includes a movably mounted subframe 178 having rods 180 that extend slidably upwardly through bushings 174. An extendable piston rod 182 extends from cylinder 176 and is connected to subframe 178. The entire lower subassembly can be lifted out of the way of carrier 22 by actuating actuators 170 (i.e. by retracting piston rods 182) or can be lowered into position by extending piston rods 182.

Figure 10:
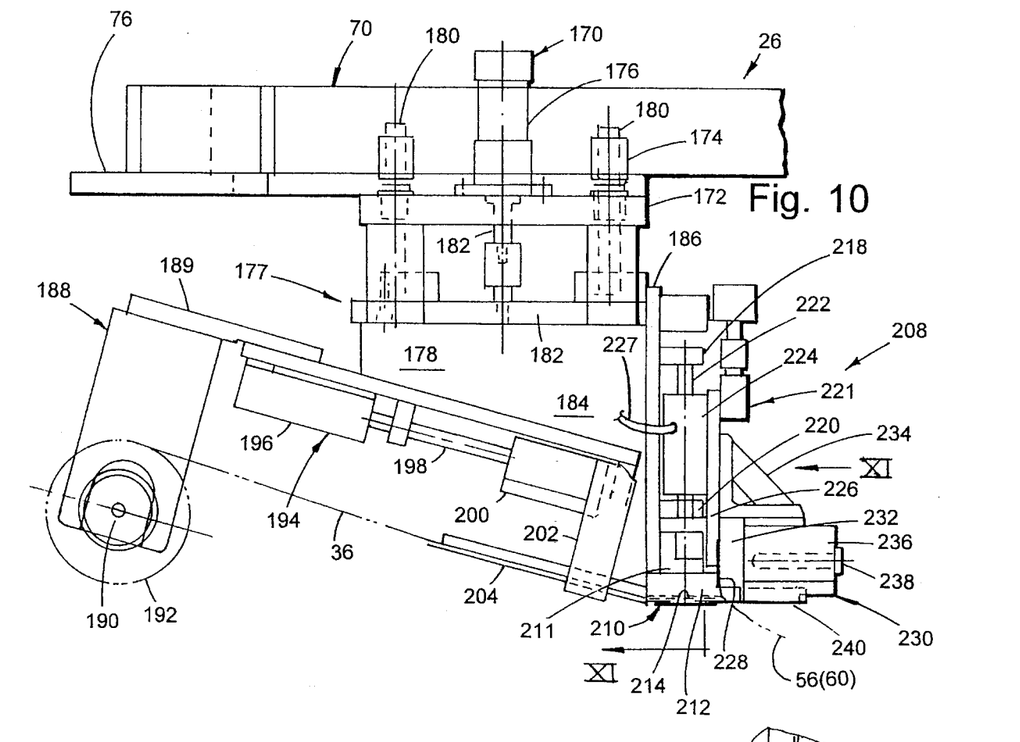
FIG. 10 is an enlarged side view of the release-paper-adhering tape applicator shown in FIG. 2 for applying and pressing the release-paper-adhering tape onto the release paper side of the composite tape after assembly of the composite tape onto the molding.
Figure 11:
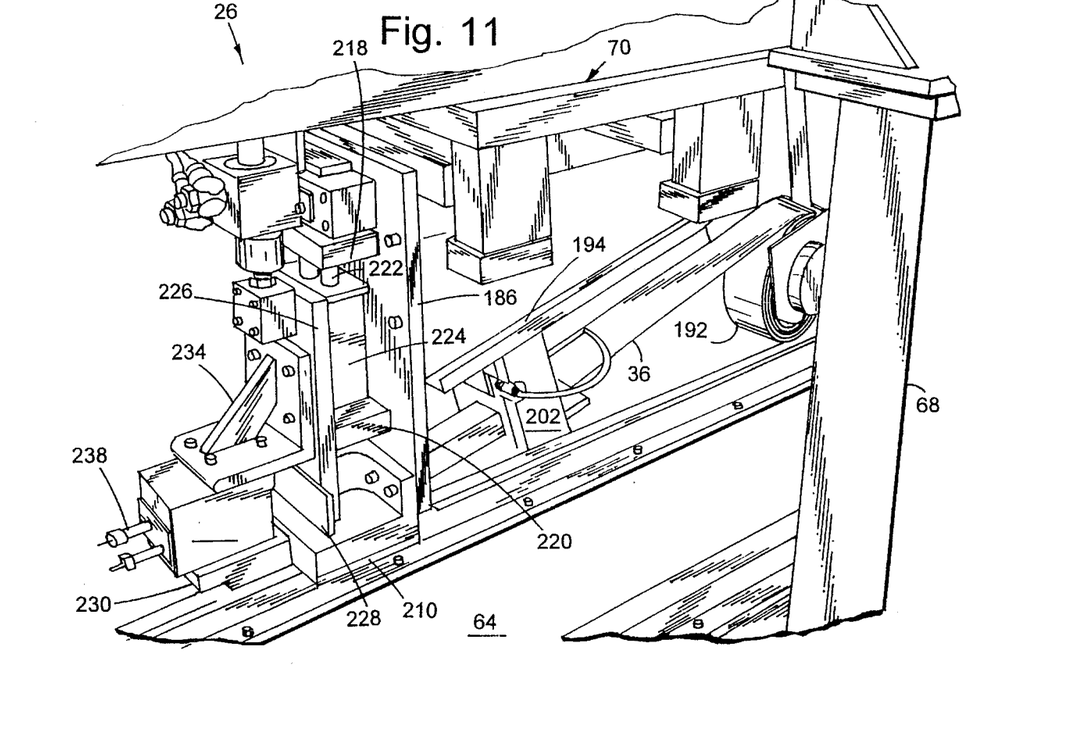
FIG. 11 is a perspective view of the release-paper-adhering tape applicator as disclosed in FIG. 10 but with the applicator being shown in a raised position relative to the molding carrier.

Subframe 178 includes an upper plate 182, side plate 184, and an end plate 186, all of which are interconnected in an orthogonal relationship. A holder 188 for release-paper-adhering tape 36 includes an arm 189 attached to upper plate 182 and a rotatably mounted axle 190 that is extendable through holes in the ends of arm 189 to hold a supply roll 192 of release-paper-adhering tape 36. A tape advancing mechanism 194 for expending release-paper-adhering tape 36 is secured under upper plate 182. Tape advancing mechanism 194 includes an actuator 196 with an extendable piston rod 198 and a slide 200 operably connected to rod 198. Slide 200 includes a tape gripping/advancing member 202 that cooperates with a tape guide or track 204 to extend release-paper-adhering tape 36 forwardly under the applying head 208 of release-paper-adhering tape applicator 26.

Figures 12, 13:
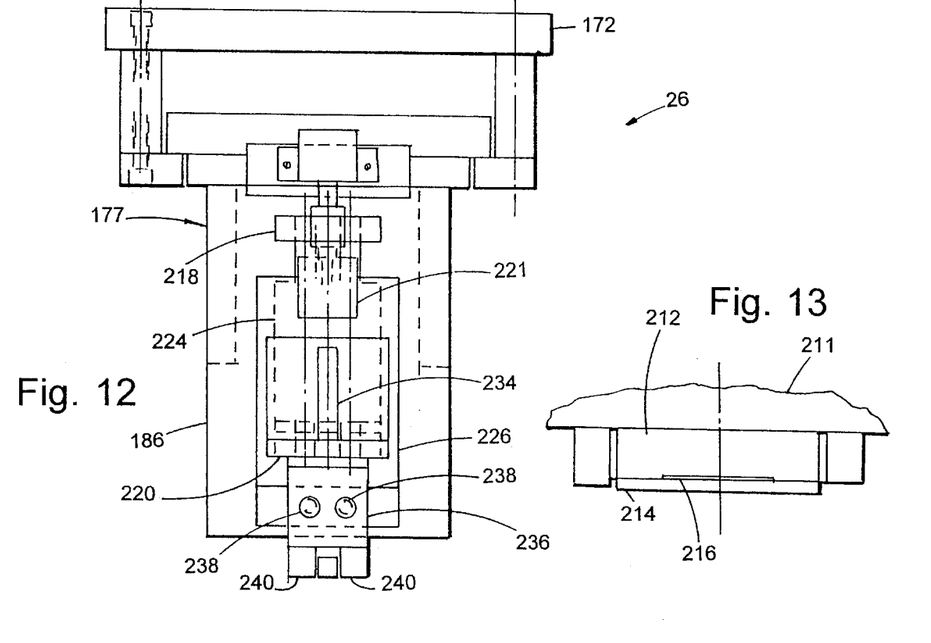
FIG. 12 is an end view of the release-paper-adhering tape applicator taken in the direction of arrow XII in FIG. 10.
FIG. 13 is a cross-sectional view taken along the plane XIII—XIII in FIG. 10.

Applying head 208 (FIG. 10) includes a lower tape guide 210 secured to the bottom of end plate 186 by a mounting block 211. Lower tape guide 210 is located in line with tape guide 204. Specifically, lower tape guide 210 (FIG. 13) includes an upper and lower die plate 212 and 214 (FIG. 13) that define a slot 216 therebetween. Slot 216 is aligned with tape guide 204. Lower tape guide 216 is made of a non-adhering material so that release-paper-adhering tape 36 can be extended through slot 216 without binding. Two supports 218 and 220 (FIG. 10) are attached to end plate 186 in a spaced apart condition. A cutter actuator 221 is mounted between supports 218 and 220 including a piston rod 222 fixedly connected to supports 218 and 220, and an actuator housing 224 operably mounted on piston rod 222. A blade holder 226 is attached to housing 224, and a cutting blade 228 is attached to the end of blade holder 226. Actuator 221 includes a piston (not shown) attached to rod 222 in housing 224, and is actuatable to move housing 224 downwardly, thus causing cutting blade 228 to extend across slot 218 of die plates 212 and 214. This cuts or separates a section of release-paper-adhering tape 36 free from the supply of release-paper-adhering tape 36. Controller 168 is operably connected to actuator housing 224 such as by pneumatic lines 227 for controlling the activation of cutter actuator 222.

A heater 230 (FIG. 10) is attached to the lower end of activator housing 224 adjacent lower tape guide 210 so that heater 230 moves with the activation of cutter actuator 222. In other words, whenever a section of release-paper-adhering tape 36 is cut, heater 230 is automatically moved downwardly against the section of release-paper-adhering tape. Heater 230 is mounted on a mounting plate 232 and reinforced by reinforcement web/block 234. Heater 230 includes a heater housing 236, a pair of heater elements 238, and a heated pressing member or iron 240 for pressing the section of release-paper-adhering tape 36 onto the release paper 38 of composite tape 30.

The operation of apparatus 20 is as follows. Controller 168 is initially programmed to perform the desired sequence, as noted below. A pair of rolls of composite tapes 30a and 30b are initially loaded onto composite tape holder 110, and strips of composite tapes 30a and 30b are threaded through aperture 108 along guide slots 104 and 106 under driving wheels 118 and 120. Composite tapes 30a and 30b can be manually positioned by grasping handles 144 and manually actuating tape advancing mechanism 96. Composite tapes 30a and 30b are extended so that the leading end droops about two or three inches below pressing member rollers 92. Also, a supply roll 192 of release-paper-adhering tape 36 is loaded on release-paper-adhering tape holder 188 by extending axle 190 through the roll 192 into an aperture in holder 188.

A molding 32 is then positioned on and secured to carrier 22 with the back side 42 of molding 32 facing generally upwardly. As apparatus 20 is initially started, carrier 22 moves molding 32 under composite tape applicator 24. Roller 92 is lowered so that the strip of expended composite tapes 30a and 30b are initially pressed against molding 32 about two to three inches from an end of molding 32. Carrier 22 then moves molding 32 so that rollers 92 rollingly press composite tapes 30a and 30b against molding back side 42 the two or three inches toward the near end of molding 32. Subsequently, carrier 22 moves molding 32 in the opposite direction and composite tapes 30a and 30b are expended by actuation of tape advancing mechanism 96 so that a strip of composite tapes 30a and 30b are pressingly adhered the full length of molding 32. Notably, both of composite tapes 30a and 30b are laid simultaneously. As composite tape applicator 24 nears the far end of molding 32, cutter actuator 152 moves cutting head 157 to sever a section of composite tapes 30a and 30b from composite tape supply 114. Pressing member 84 of composite tape applicator 24 is then raised by actuators 85. Tape advancing mechanism 96 continues to feed composite tapes 30a and 30b forwardly for a short time such that a length of two to three inches of composite tape 30a and 30b extends downwardly below roller 92 as was the case during the initial phase at the start of the assembly sequence.

Controller 168 determines the location of the ends of composite tapes 30a and 30b from input provided by carrier position sensor 167. After composite tapes 30a and 30b are completely applied to molding 32 and pressed in place, carrier 22 moves to a position such that the ends of composite tapes 30a and 30b are positioned under release-paper-adhering tape applicator 26. Controller 168 then causes release-paper-adhering tape applicator 26 to expend a section of release-paper-adhering tape 36 by activating actuators 170 to lower the applicator and actuators 196 to expend the tape. It is contemplated that carrier 22 will be moved along with release-paper-adhering tape 36 as release paper 36 is expended to facilitate proper positioning of the section of release-paper-adhering tape 36, however different sequences are possible while still achieving a desired result. Once tape 36 is expended a desired amount, cutting blade 228 is extended by cutter actuator 222. As cutter blade 228 cuts the section of tape from the strip of release-paper-adhering tape 36, heater 230 presses the section 56 (or 60) of release-paper-adhering tape 36 into secure adhering contact with release paper 38. Thus, the steps of pressing and heating are done substantially simultaneously. After application of release-paper-adhering tape 36, carrier 22 moves molding 32 to a position where molding 32 can be readily removed.

As the supply rolls 114 of composite tapes 30a and 30b become used up, there will occasionally be a need for splicing. For example, as composite tape 30a is used up, tape sensor 115 on mounting plate 98 of tape advancing mechanism 96 senses that the end of the supply roll is used up and stops the machine. An operator then positions a new roll 114 of composite tape in the composite tape holder 110 and manually adjusts the leading edge of the new supply roll so that the leading edge abuts the trailing edge of the previously roll. When apparatus 20 is stopped for lack of composite tape 30a (or 30b), controller 168 stores data representing where the carrier 22 is stopped. Upon completion of laying composite tapes 30a and 30b, apparatus 20 will then not only apply release-paper-adhering tape 36 to release papers 38 at one of the ends of composite tapes 30a and 30b, but also will apply section 60 of release-paper-adhering tape 36 to the spliced location 54. The reason for applying the section 60 of release-paper-adhering tape 36 to splice locations 54 is so that when an operator later pulls release-paper-adhering tape 36, the release paper 38 along the full length of molding 32 can be removed with a single, continuous pull.

Thus, an apparatus for laying a composite tape on an elongated molding, and further for laying a section of release-paper-adhering tape onto the release paper on the composite tape is provided. The apparatus includes a carrier configured to support the elongated molding, and a composite tape applicator and a release-paper-adhering tape applicator which cooperate to efficiently lay composite tape and a release-paper-adhering tape to the molding so that the molding can be later applied to the vehicle in an efficient manner. Further, scrap is reduced and the tedious task of laying straight lines of composite tape and also of picking the release paper loose from the composite tape are eliminated.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. An apparatus for laying a composite tape on an elongated molding for a vehicle, the composite tape including a flexible substrate having sides, adhesive covering the sides, a release paper covering the adhesive on one side, the elongated molding including a back side, said apparatus comprising:

a carrier configured to support the elongated molding with at least part of the molding back side exposed and located generally along a predetermined plane;

a composite tape applicator including a tape advancing mechanism for expending at least one strip of composite tape from a supply of composite tape and a composite-tape pressing roller positioned in said plane for pressing the extended strip of composite tape onto the back side of the elongated molding as the molding is being supported on said carrier, one of said carrier and said composite tape applicator being movable relative to the other of said carrier and said composite tape applicator; and a second tape applicator generally aligned with and positioned proximate said composite tape applicator for applying and depositing a section of the release-paper-adhering tape to the release paper on the composite tape on the molding, said second tape applicator including a second pressing roller positioned in the plane and aligned with the first pressing roller so that the section of release-paper-adhering tape is pressed by the second pressing member shortly after the composite tape is applied to become a part of an assembly including the molding and the expended strip of composite tape.

2. An apparatus as defined in claim 1 wherein said composite tape applicator is constructed to apply a pair of spaced apart strips of composite tape onto the molding back side.

3. An apparatus as defined in claim 2 including an actuator and a controller operably connected to said carrier for controlling the position of said carrier, said controller being operably connected to said actuator to thus control the movement of the molding relative to said applicators.

4. An apparatus as defined in claim 3 including a carrier position sensor for inputting the position of said carrier to said controller.

5. An apparatus as defined in claim 4 including a second actuator for said second tape applicator and means for determining the location of a splice in the strips of composite tape, said controller being operably connected to said second actuator and said carrier position sensor so that, if one of the strips of composite tape applied to the molding is spliced, a section of release-paper-adhering tape is applied across the splice location.

6. An apparatus as defined in claim 5 including a heater for heating the release-paper-adhering tape and the composite tape so that the section of release-paper-adhering tape securely bonds to the release paper of the composite tape.

7. An apparatus as defined in claim 1 wherein said carrier is reciprocatingly movably mounted to a support surface, and including actuators for controlling the movement of said carrier and a controller for controlling said applicators, said controller being operably connected to said actuators so that the strip of composite tape is applied to the length of the molding and so that the release-paper-adhering tape is applied at least to an end of the strip of composite tape on each molding with the release-paper-adhering tape extending from the strip of composite tape.

8. An apparatus as defined in claim 7 including a carrier position sensor operably connected to said controller, said controller including means for recalling locations at which the strips of composite tape are spliced and including means for actuating said second tape applicator to apply a section of release-paper-adhering tape across any spliced locations.

9. An apparatus as defined in claim 8 wherein said controller is adapted to store data representing the position of any of the spliced locations and said controller is programmed to automatically actuate said second tape applicator to apply a section of release-paper-adhering tape to the spliced locations after the composite tape has been applied.

10. An apparatus as defined in claim 1 including a first cutter for cutting the strip of composite tape from the supply of the composite tape, and a second cutter for cutting the section of release-paper-adhering tape from a supply of the release-paper-adhering tape.

11. An apparatus as defined in claim 1 including a heater for heating the section of release-paper-adhering tape to enhance the adhesion of the release-paper-adhering tape to the release paper.

12. An apparatus for laying a composite tape on an elongated molding for a vehicle, the composite tape including a flexible substrate having sides, exposed adhesive covering one of the sides and a release paper covering adhesive on the other side, the elongated molding including a back side, comprising:

a carrier configured to support the elongated molding with at least part of the molding back side exposed; and a composite tape applicator including a tape advancing mechanism having a non-stick surface for frictionally drivingly engaging the exposed adhesive on the one side of the composite tape for expending at least one strip of composite tape from a supply of composite tape and a composite-tape-pressing member positionable proximate said carrier for pressing the expended strip of composite tape onto the back side of the elongated molding, said carrier being moveable relative to said applicator, whereby as said molding is moved beneath said applicator on said carrier, said tape is applied to and pressed against said molding.

13. An apparatus as defined in claim 12 wherein said carrier is reciprocatingly moveable.

14. An apparatus as defined in claim 12 including a controller operably connected to said carrier for controlling the movement of the carrier and to said composite tape applicator for controlling the actuation of the composite-type applicator, and a sensor for sensing when the supply has run out of composite tape, the controller also being operably connected to the sensor and being programmed to control the movement of the carrier and the composite tape applicator to facilitate manually splicing a new strip of the composite tape onto the molding adjacent and in line with the end of a previously applied strip of the composite tape.

15. An apparatus as defined in claim 14 wherein the controller includes a memory and, upon the sensor sensing that the supply has run out of composite tape, the controller stores data in the memory representing the location of a trailing end of the run-out supply of composite tape.

16. An apparatus for laying composite tape onto a molding, the composite including a flexible substrate, adhesive located on opposing sides of the substrate, and a release paper located on the adhesive on one of the sides, the molding including a decorative side and a back side, comprising:

a holder for holding a supply of the composite tape;

a guide mechanism including a track for guiding a strip of the composite tape as the composite tape is expended from the supply;

a tape advancing mechanism having a non-stick surface for frictionally drivingly engaging the composite tape on the side of the composite tape which has exposed adhesive, said tape advancing mechanism being adapted to controllingly expend a strip of the composite tape; and at least one pressing member for pressing the expended strip of the composite tape onto the back side of the molding so that the adhesive on the other side adequately bonds to the molding back side.

17. An apparatus as defined in claim 16 wherein said tape advancing mechanism includes actuators for automatically actuating said tape advancing mechanism and also includes handles for manually actuating said tape advancing mechanism.

18. An apparatus as defined in claim 17 including second actuators for raising and lowering said tape advancing mechanism and said tape applicator.

19. An apparatus as defined in claim 18 including a controller operably connected to said first and second actuators for automatically operating said tape advancing mechanism.

20. An apparatus for applying a section of release-paper-adhering tape to a release-paper-covered side of a composite tape, the release paper covered side including adhesive and release paper covering the adhesive, the composite tape being secured to a substrate comprising:

a supply of release-paper-adhering tape;

a holder for holding the supply of release-paper-adhering tape as the release-paper-adhering tape is expended from the supply;

a tape advancing mechanism engaging the release-paper-adhering tape to controllingly expend a section of the release-paper-adhering tape;

a cutter for cutting the section from the supply;

a support configured to movably support the substrate with the composite tape positioned in an exposed position;

at least one pressing member for pressing the expended strip of the release-paper-adhering tape onto the release paper so that the release-paper-adhering tape adequately bonds to the release paper for later removal; and a sensor for sensing an end of the composite tape, said tape advancing mechanism being operably connected to the sensor and configured and programmed to apply the section of release-paper-adhering tape overhangingly to the end of the composite tape.

21. An apparatus as defined in claim 20 including a heater for heating the section of release-paper-adhering tape to assure adequate bonding of the release-paper-adhering tape to the release paper.

22. An apparatus as defined in claim 20 including a cutter for cutting the section from the supply.

23. An apparatus as defined in claim 22 including a controller operably connected to said tape advancing mechanism and said cutter for automatic operation of same.

24. An apparatus as defined in claim 23 including a carrier for the substrate, said controller being connected to said carrier and being programmed so that said carrier automatically moves an end of the release paper proximate said tape advancing mechanism whereupon said tape advancing mechanism is actuated to adhere a section of release-paper-adhering tape to the end.

25. An apparatus as defined in claim 24 including means for recalling the location of a splice in the release paper, said controller being connected to said means for recalling and being programmed so that said carrier automatically moves the splice proximate said tape advancing mechanism whereupon another section of release-paper-adhering tape is adhered to the splice location.

26. An apparatus as defined in claim 20 including means for applying composite tape to the substrate.

27. An apparatus as defined in claim 1 wherein said second tape applicator includes a supply of release-paper-adhering tape.

28. An apparatus as defined in claim 27 wherein said composite tape applicator includes a supply of composite tape.

29. An apparatus as defined in claim 1 including a frame, said composite tape applicator and said second tape applicator being supported on said frame in locations generally adjacent each other.

30. An apparatus as defined in claim 29 wherein said second tape applicator is located in a direction downstream of said composite tape applicator so that said section of release-paper-adhering tape can be applied substantially in the same operation as the composite tape.

31. An apparatus as defined in claim 12 wherein said tape advancing mechanism includes a guide plate defining an elongated slot for guiding the composite tape from the supply of composite tape to the composite-tape-pressing member.

32. An apparatus as defined in claim 16 wherein said tape advancing mechanism includes a guide plate defining an elongated slot for guiding the composite tape from the supply of composite tape to the composite-tape-pressing member.

33. An apparatus for laying prefabricated tapes in successive layers onto a substrate, comprising:

a frame;

a supply of composite tape operably supported on said frame;

a composite tape applicator supported on said frame and configured to expend a strip of the composite tape from the supply of composite tape, the composite tape applicator including a composite-tape pressing member positionable for pressing an expended strip of the composite tape onto a back side of the substrate;

a supply of release-paper-adhering tape operably supported on said frame; and a second tape applicator supported on said frame for selectively applying a section of the release-paper-adhering tape overhangingly onto an end of release paper on the expended strip, the second tape applicator including a second pressing member positionable to press the section of release-paper-adhering tape securely onto the release paper of the expended strip of composite tape so that the section of release-paper-adhering tape becomes a part of an assembly including the substrate and the expended strip of composite tape.

34. An apparatus for laying prefabricated tapes onto a substrate in successive layers in substantially a single operation, said apparatus comprising:

a support for movably supporting the substrate;

a frame;

a first tape applicator operably supported on the frame, said first tape applicator including a first pressure roller for pressing an expended strip of composite tape onto a back side of the substrate;

a second tape applicator supported on the frame in alignment with said first tape applicator, said second tape applicator including a second pressure roller for pressing a short section of the release-paper-adhering tape onto a subassembly including the substrate and the expended strip of composite tape in a predetermined location;

actuators for independently actuating the first and second applicators; and a controller for independently controlling the actuators and the support.

35. An apparatus as defined in claim 34 including a sensor for sensing an end of the composite tape, said controller being operably connected to said second tape applicator and said support for actuating the second tape applicator to apply the section of release-paper-adhering tape to the release paper with the section overhanging an end of the composite tape.

36. An apparatus for laying successive layers of prefabricated tapes onto a substrate having a tape-receiving surface, said apparatus comprising:

a support configured to movably support the substrate with the tape-receiving surface exposed and positioned proximate a predetermined plane;

first and second aligned tape applicators including first and second tape pressing members, respectively, located along said predetermined plane and configured to press successive layers of prefabricated tape onto the substrate such that an earlier-applied tape is applied to the tape-receiving surface and a later-applied tape is applied to predetermined locations on the earlier-applied tape; and a locating mechanism operably connected to said second tape applicator for locating the later-applied tape in the predetermined locations.

37. An apparatus as defined in claim 36 wherein said locating mechanism includes a controller operably connected to said second tape applicator for applying a section of the later-applied tape overhangingly at an end of the earlier-applied tape so that the later-applied section of tape dangles off an end of the earlier-applied tape.

* * * * *